(12) United States Patent
Li et al.

(10) Patent No.: US 10,499,248 B2
(45) Date of Patent: Dec. 3, 2019

(54) SECURE INTERACTION METHOD AND DEVICE

(71) Applicant: Huawei Technologies Co., Ltd., Shenzhen (CN)

(72) Inventors: Wenhao Li, Shanghai (CN); Yubin Xia, Shanghai (CN); Haibo Chen, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 190 days.

(21) Appl. No.: 15/435,507

(22) Filed: Feb. 17, 2017

(65) Prior Publication Data

US 2017/0164201 A1    Jun. 8, 2017

(51) Int. Cl.
*H04W 12/08* (2009.01)
*G06F 21/74* (2013.01)
(Continued)

(52) U.S. Cl.
CPC ............ *H04W 12/08* (2013.01); *G06F 12/14* (2013.01); *G06F 13/28* (2013.01);
(Continued)

(58) Field of Classification Search
CPC ...... G06F 12/14; G06F 13/28; G06F 13/4022; G06F 21/53; G06F 21/57–577;
(Continued)

(56) References Cited

U.S. PATENT DOCUMENTS

| 8,001,592 B2 | 8/2011 | Hatakeyama |
| 8,621,242 B2 | 12/2013 | Brown et al. |

(Continued)

FOREIGN PATENT DOCUMENTS

| CN | 101939750 A | 1/2011 |
| CN | 101997956 A | 3/2011 |

(Continued)

OTHER PUBLICATIONS

Foreign Communication From a Counterpart Application, Chinese Application No. 201480001049.7, Chinese Notice of Allowance dated Jul. 26, 2018, 4 pages.

(Continued)

*Primary Examiner* — Kevin Bechtel
(74) *Attorney, Agent, or Firm* — Conley Rose, P.C.

(57) ABSTRACT

A secure interaction method includes receiving, by a processor, a secure processing request sent by an application program, where the application program operates in a normal mode, and the processor operates in the normal mode when receiving the secure processing request, switching, by the processor, from the normal mode to a secure mode according to the secure processing request, reading, by the processor operating in the secure mode, data information into a memory operating in the secure mode, where the data information is data that the processor operating in the secure mode generates after parsing the secure processing request, and controlling, by the processor operating in the secure mode, an accessed device to operate according to the data information stored in the memory operating in the secure mode.

20 Claims, 6 Drawing Sheets

(51) Int. Cl.
*G06F 21/84* (2013.01)
*G06F 12/14* (2006.01)
*G06F 13/28* (2006.01)
*G06F 13/40* (2006.01)
*G06F 21/57* (2013.01)
*G06F 21/62* (2013.01)
*G06F 21/60* (2013.01)

(52) U.S. Cl.
CPC .......... *G06F 13/4022* (2013.01); *G06F 21/57* (2013.01); *G06F 21/62* (2013.01); *G06F 21/74* (2013.01); *G06F 21/84* (2013.01); *G06F 21/606* (2013.01); *G06F 2212/1052* (2013.01)

(58) Field of Classification Search
CPC .......... G06F 21/606; G06F 21/62–629; G06F 21/71; G06F 21/74; G06F 21/84; G06F 2212/1052; H04W 12/08
See application file for complete search history.

(56) References Cited

U.S. PATENT DOCUMENTS

| | | | |
|---|---|---|---|
| 2004/0123118 A1* | 6/2004 | Dahan | G06F 21/36 713/189 |
| 2008/0040797 A1* | 2/2008 | Schwartz | G06F 21/74 726/19 |
| 2008/0163368 A1 | 7/2008 | Harris et al. | |
| 2008/0282342 A1 | 11/2008 | Hatakeyama | |
| 2010/0031320 A1 | 2/2010 | Bhesania et al. | |
| 2011/0093723 A1 | 4/2011 | Brown et al. | |
| 2013/0145475 A1 | 6/2013 | Ryu et al. | |
| 2013/0301830 A1 | 11/2013 | Bar-El et al. | |
| 2015/0302201 A1 | 10/2015 | Ryu | |

FOREIGN PATENT DOCUMENTS

| | | | |
|---|---|---|---|
| CN | 103136488 A | 6/2013 | |
| CN | 103532938 A | 1/2014 | |
| JP | 2013117962 A | 6/2013 | |
| KR | 20130062219 A | 6/2013 | |
| KR | 20140023606 A | 2/2014 | |
| WO | 2011051757 A1 | 5/2011 | |
| WO | 2014027859 A1 | 2/2014 | |

OTHER PUBLICATIONS

Foreign Communication From a Counterpart Application, Chinese Application No. 201480001049.7, Chinese Office Action dated Feb. 14, 2018, 5 pages.
Machine Translation and Abstract of Japanese Publication No. JP2013117962, Jun. 13, 2013, 15 pages.
Foreign Communication From a Counterpart Application, Japanese Application No. 2017-510332, English Translation of Japanese Office Action dated May 22, 2018, 5 pages.
Machine Translation and Abstract of Korean Publication No. KR20130062219, Jun. 12, 2013, 16 pages.
Foreign Communication From a Counterpart Application, Korean Application No. 10-2017-7007254, English Translation of Korean Office Action dated May 1, 2018, 4 pages.
Machine Translation and Abstract of Chinese Publication No. CN101997956, Mar. 30, 2011, 16 pages.
Machine Translation and Abstract of Chinese Publication No. CN103532938, Jan. 22, 2014, 12 pages.
Coombs, R., "GlobalPlatform based Trusted Execution Environment and TrustZone Ready," XP55195598, White Paper, ARM, ATC-314, Oct. 31, 2013, 10 pages.
Foreign Communication From a Counterpart Application, European Application No. 14899967.5, Extended European Search Report dated Apr. 6, 2017, 9 pages.
Foreign Communication From a Counterpart Application, PCT Application No. PCT/CN2014/084893, English Translation of International Search Report dated May 4, 2015, 2 pages.
Foreign Communication From a Counterpart Application, PCT Application No. PCT/CN2014/084893, English Translation of Written Opinion dated May 4, 2015, 7 pages.

* cited by examiner

SECURE INTERACTION METHOD AND DEVICE

CROSS-REFERENCE TO RELATED APPLICATIONS

This application is a continuation of International Patent Application No. PCT/CN2014/084893 filed on Aug. 21, 2014, which is hereby incorporated by reference in its entirety.

TECHNICAL FIELD

Embodiments of the present application relate to the communications field, and in particular, to a secure interaction method and device.

BACKGROUND

A trusted computing base (TCB) refers to a generic term for protection apparatuses in a computer system. The TCB establishes a secure protection environment for the computer system. Although a smartphone system has abundant functions, the smartphone system needs support of a large amount of bottom-layer code. For example, in an ANDROID system, the entire ANDROID system has more than ten million lines of source code of a software stack of a TCB. Once malware intrudes the system using a security vulnerability of the existing software stack, security of a user input operation and input display cannot be ensured.

In real life, shopping using an electronic device has become a part of people's daily life. However, security in terms of payment further needs to be ensured. In an example of a bank payment application, for input, if malware secretly intercepts input data, a password entered by a user may be leaked out, and for display, if malware secretly changes display data by manipulating a display buffer, an account of the user may be stolen without the knowledge of the user.

Currently, to improve security of an operating system, a Trusted Execution Environment, such as TRUSTZONE technology, may be used. In the TRUSTZONE, a monitor mode, a secure mode, and a normal mode are set. The monitor mode has a highest security level, and switching between the secure mode and the normal mode may be implemented using the monitor mode. The normal mode is the same as a mode in which the operating system usually runs. The secure mode is totally isolated from the normal mode, but devices such as all physical memories in the normal mode may be accessed in the secure mode. For example, when a mobile phone is powered on, the mobile phone first enters the secure mode, and a program in the secure mode is responsible for switching to the normal mode, to start a system of the mobile phone. For an existing system, the existing system may run in the normal mode, and a program having a relatively high security level runs in the secure mode.

In an application scenario in which system security is improved using a TRUSTZONE mechanism, an existing system runs in the normal mode, and a secure processing function is provided in the secure mode, to implement secure isolation from the existing system. Because a program in the normal mode is non-trusted, if code of a driver device of the program is directly reused, data in the secure mode may be leaked out or tampered. To process, in the secure mode, a request of an application program, an existing method is to implement, in the secure mode, a driver code of an accessed device again. However, because many drivers in the existing system are all provided by a third party, source driver code cannot be obtained, and a limited quantity of device drivers is supported in the secure mode. Another method is to port all driver modules in the existing system to the secure mode. Using this method, a sufficient quantity of device drivers may be supported in the secure mode. However, as a result, a code amount in the secure mode rapidly increases, and a TCB becomes excessively large. It can be seen that a better solution still remains to be proposed to ensure security during the processing on the request of the application program.

SUMMARY

Embodiments of the present application provide a secure interaction method and device, to securely invoke, in a secure mode, code of a driver module operating in a normal mode, and reduce a TCB.

According to a first aspect, an embodiment of the present application provides a secure interaction method, and the method includes receiving, by a processor, a secure processing request sent by an application program, where the application program operates in a normal mode, and the processor operates in the normal mode when receiving the secure processing request, switching, by the processor, from the normal mode to a secure mode according to the secure processing request, reading, by the processor operating in the secure mode, data information into a memory operating in the secure mode, where the data information is data that the processor operating in the secure mode generates after parsing the secure processing request, and controlling, by the processor operating in the secure mode, an accessed device to operate according to the data information stored in the memory operating in the secure mode, where the accessed device operates in the normal mode, the accessed device responds to control of the processor only when the processor operates in the secure mode, and the accessed device is a device that needs to operate after being invoked by the application program.

With reference to the first aspect, in a first possible implementation manner of the first aspect, after switching, by the processor, from the normal mode to a secure mode according to the secure processing request, the method further includes reading, by the processor operating in the secure mode, a security indicator from the memory operating in the secure mode, and notifying, according to the read security indicator by the processor operating in the secure mode, a user that a current environment is in a secure state.

With reference to the first possible implementation manner of the first aspect, in a second possible implementation manner of the first aspect, notifying, according to the read security indicator by the processor operating in the secure mode, a user that a current environment is in a secure state includes controlling, according to the read security indicator by the processor operating in the secure mode, a security indication device to operate, where the security indication device operates in the secure mode, and the security indication device responds to control of the processor only when the processor operates in the secure mode.

With reference to the first possible implementation manner of the first aspect, in a third possible implementation manner of the first aspect, notifying, according to the read security indicator by the processor operating in the secure mode, a user that a current environment is in a secure state includes controlling, by the processor operating in the secure mode, a display unit to display the security indicator that is read from the memory operating in the secure mode, where the display unit operates in the normal mode, and the display unit responds to control of the processor only when the processor operates in the secure mode.

With reference to the first aspect, or the first, the second, or the third possible implementation manner of the first aspect, in a fourth possible implementation manner of the first aspect, reading, by the processor operating in the secure mode, data information into a memory operating in the secure mode includes reading, by the processor operating in the secure mode, frame buffer information into the memory operating in the secure mode, where the frame buffer information is obtained, by the processor operating in the secure mode, from an interface provided by a frame buffer device, and the frame buffer device operates in the normal mode.

With reference to the fourth possible implementation manner of the first aspect, in a fifth possible implementation manner of the first aspect, the accessed device is the display unit, and controlling, by the processor operating in the secure mode, an accessed device to operate according to the data information stored in the memory operating in the secure mode includes controlling, by the processor operating in the secure mode, the display unit to display the frame buffer information read from the memory operating in the secure mode, where the display unit operates in the normal mode, and the display unit responds to control of the processor only when the processor operates in the secure mode.

With reference to the fifth possible implementation manner of the first aspect, in a sixth possible implementation manner of the first aspect, controlling, by the processor operating in the secure mode, the display unit to display the frame buffer information read from the memory operating in the secure mode includes controlling, by the processor operating in the secure mode, the display unit to display a foreground layer and a background layer, where the frame buffer information is displayed at the foreground layer, a background is displayed at the background layer, and the foreground layer and the background layer are displayed in different colors.

With reference to the first aspect, or the first, the second, or the third possible implementation manner of the first aspect, in a seventh possible implementation manner of the first aspect, the reading, by the processor operating in the secure mode, data information into a memory operating in the secure mode includes obtaining, by the processor operating in the secure mode, user data entered into an input device by the user, where the input device operates in the normal mode, performing, by the processor operating in the secure mode, verification processing on the obtained user data, to obtain result data, and reading, by the processor operating in the secure mode, the result data into the memory operating in the secure mode.

With reference to the seventh possible implementation manner of the first aspect, in an eighth possible implementation manner of the first aspect, the accessed device is the display unit, and controlling, by the processor operating in the secure mode, an accessed device to operate according to the data information stored in the memory operating in the secure mode includes controlling, by the processor operating in the secure mode, the display unit to display the result data read from the memory operating in the secure mode, where the display unit operates in the normal mode, and the display unit responds to control of the processor only when the processor operates in the secure mode.

With reference to the first aspect, in a ninth possible implementation manner of the first aspect, before receiving, by a processor, a secure processing request sent by an application program, the method further includes setting, by the processor, the accessed device to accessible by the processor operating in the secure mode, and loading, by the processor, an operating system to the memory operating in the normal mode such that driver code starts and executes the application program operating in the normal mode.

According to a second aspect, an embodiment of the present application further provides a secure interaction device, and the device includes a processor, a memory, and an accessed device, where the processor is configured to receive a secure processing request sent by an application program, where the application program operates in a normal mode, and the processor operates in the normal mode when receiving the secure processing request. The processor is configured to switch from the normal mode to a secure mode according to the secure processing request. The processor operating in the secure mode is configured to read data information into the memory operating in the secure mode, where the data information is data that the processor operating in the secure mode generates after parsing the secure processing request, and the processor operating in the secure mode is configured to control the accessed device to operate according to the data information stored in the memory operating in the secure mode, where the accessed device operates in the normal mode, the accessed device responds to control of the processor only when the processor operates in the secure mode, and the accessed device is a device that needs to operate after being invoked by the application program.

With reference to the second aspect, in a first possible implementation manner of the second aspect, the processor operating in the secure mode is further configured to read a security indicator from the memory operating in the secure mode after the processor switches from the normal mode to the secure mode according to the secure processing request, and the processor operating in the secure mode is further configured to notify, according to the read security indicator, a user that a current environment is in a secure state.

With reference to the first possible implementation manner of the second aspect, in a second possible implementation manner of the second aspect, the secure interaction device further includes a security indication device, and the processor operating in the secure mode is further configured to control, according to the read security indicator, the security indication device to operate, where the security indication device operates in the secure mode, and the security indication device responds to control of the processor only when the processor operates in the secure mode.

With reference to the first possible implementation manner of the second aspect, in a third possible implementation manner of the second aspect, the processor operating in the secure mode is further configured to control a display unit to display the security indicator that is read from the memory operating in the secure mode, where the display unit operates in the normal mode, and the display unit responds to control of the processor only when the processor operates in the secure mode.

With reference to the second aspect, or the first, the second, or the third possible implementation manner of the second aspect, in a fourth possible implementation manner of the second aspect, the processor operating in the secure mode is further configured to read frame buffer information into the memory operating in the secure mode, where the frame buffer information is obtained, by the processor operating in the secure mode, from an interface provided by a frame buffer device, and the frame buffer device operates in the normal mode.

With reference to the fourth possible implementation manner of the second aspect, in a fifth possible implementation manner of the second aspect, the accessed device is the display unit, and the processor operating in the secure mode is further configured to control the display unit to display the frame buffer information that is read from the memory operating in the secure mode, where the display unit operates in the normal mode, and the display unit responds to control of the processor only when the processor operates in the secure mode.

With reference to the fifth possible implementation manner of the second aspect, in a sixth possible implementation manner of the second aspect, the processor operating in the secure mode is further configured to control the display unit to display a foreground layer and a background layer, where the frame buffer information is displayed at the foreground layer, a background is displayed at the background layer, and the foreground layer and the background layer are displayed in different colors.

With reference to the second aspect, or the first, the second, or the third possible implementation manner of the second aspect, in a seventh possible implementation manner of the second aspect, the processor operating in the secure mode is further configured to obtain user data that is entered into an input device by the user, where the input device operates in the normal mode, perform verification processing on the obtained user data, to obtain result data, and read the result data into the memory operating in the secure mode.

With reference to the seventh possible implementation manner of the second aspect, in an eighth possible implementation manner of the second aspect, the accessed device is the display unit, and the processor operating in the secure mode is further configured to control the display unit to display the result data that is read from the memory operating in the secure mode, where the display unit operates in the normal mode, and the display unit responds to control of the processor only when the processor operates in the secure mode.

With reference to the second aspect, in a ninth possible implementation manner of the second aspect, the processor is further configured to set the accessed device to accessible by the processor operating in the secure mode, and the processor is further configured to load an operating system to the memory operating in the normal mode such that driver code starts and executes the application program operating in the normal mode.

It can be learned from the foregoing technical solutions that the embodiments of the present application have the following advantages.

In the embodiments of the present application, an application program operating in a normal mode sends a secure processing request to a processor. The processor operates in the normal mode when receiving the secure processing request. Next, the processor switches from the normal mode to a secure mode according to the secure processing request. The processor operating in the secure mode reads data information into a memory operating in the secure mode, and finally, the processor operating in the secure mode controls an accessed device to operate according to the data information stored in the memory operating in the secure mode, where the accessed device operates in the normal mode, and the accessed device responds to control of the processor only when the processor operates in the secure mode. In the embodiments of the present application, an original operating mode of an application program and that of an accessed device are unchanged, and the application program and the accessed device still operate in a normal mode. However, a processor switches from the normal mode to a secure mode according to a secure processing request sent by the application program. The processor operating in the secure mode generates data information after parsing the secure processing request, and reads the data information into a memory operating in the secure mode. Therefore, the processor operating in the secure mode can access the memory operating in the secure mode. Because the accessed device responds to control of the processor only when the processor operates in the secure mode, only when operating in the secure mode, the processor can control the accessed device to operate. Therefore, security in an interaction process can be ensured in the embodiments of the present application. Because both the application program and the accessed device operate in the normal mode, driver code for driving the application program and driver code for driving the accessed device still operate in the normal mode, and there is no need to implement the driver code in the secure mode again. Therefore, there is neither a need to rely on original driver code provided by a third party, nor a need to port both the application program and the accessed device to the secure mode. Therefore, in the embodiments of the present application, all accessed devices can be supported, and a TCB can be reduced.

DESCRIPTION OF EMBODIMENTS

Embodiments of the present application provide a secure interaction method and device, to securely invoke, in a secure mode, code of a driver module operating in a normal mode, and reduce a TCB.

To make the application objectives, features, and advantages of the present application clearer and more comprehensible, the following clearly describes the technical solutions in the embodiments of the present application with reference to the accompanying drawings in the embodiments of the present application. The embodiments described in the following are only a part rather than all of the embodiments of the present application. All other embodiments obtained by persons skilled in the art based on the embodiments of the present application shall fall within the protection scope of the present application.

In the specification, claims, and foregoing accompanying drawings of the present application, terms such as "first" and "second" are used to distinguish between similar objects, and are not necessarily used to describe a specific sequence or order. It should be understood that the terms used in such a way are interchangeable in proper circumstances. This is only a discrimination manner that is used when objects having a same attribute are described in the embodiments of the present application. In addition, terms such as "include," "contain" and any other variants are intended to cover a non-exclusive inclusion such that a process, method, system, product, or device that includes a series of units is not necessarily limited to those units, but may include other units that are not expressly listed or inherent to the process, method, system, product, or device.

Details are separately described in the following.

Figure 1:
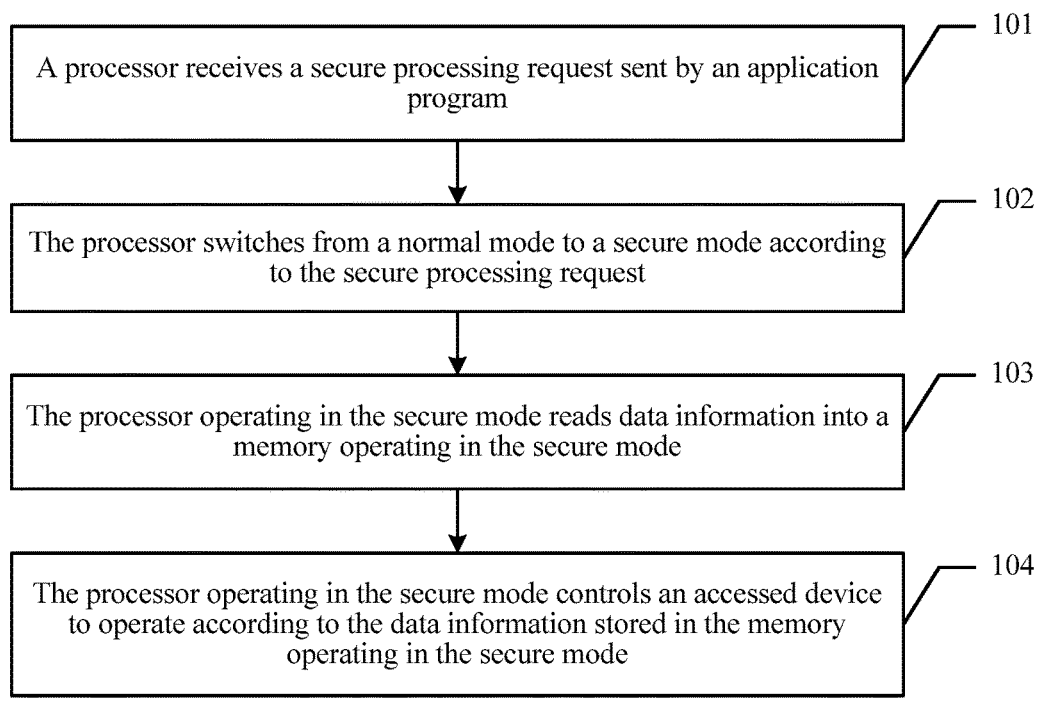
FIG. 1 is a schematic block flowchart of a secure interaction method according to an embodiment of the present application.

As shown in FIG. 1, a secure interaction method provided in an embodiment of the present application may include the following steps.

Step 101: A processor receives a secure processing request sent by an application program.

The application program operates in a normal mode, and the processor operates in the normal mode when receiving the secure processing request.

In this embodiment of the present application, the processor has two operating modes: a normal mode and a secure mode. The secure mode and the normal mode are two mutually isolated running environments. The normal mode is the same as a mode in which an operating system usually runs. The normal mode may also be referred to as a non-secure mode. The processor is non-trusted, and may be malicious when operating in the normal mode. The secure mode is totally isolated from the normal mode. However, the processor operating in the secure mode may access devices such as all memories that operate in the normal mode, but the processor operating in the normal mode cannot access a device operating in the secure mode. Likewise, in this embodiment of the present application, a memory also has two operating modes: a normal mode and a secure mode. Further, a physical memory may be divided into two parts. One part operates in the normal mode, and the other part operates in the secure mode.

In this embodiment of the present application, there is no need to change an operating mode of the application program, and the application program does not need to run in the secure mode. Instead, the application program works in the normal mode. The processor operates in the normal mode when receiving the secure processing request, that is, the processor operating in the normal mode may interact with the application program operating in the normal mode. The processor requests each application program to initiate a secure processing request when each application program needs to be executed, and the processor receives the secure processing request. The secure processing request sent by the application program to the processor is used for enabling the secure mode by the processor such that the processor can ensure security when performing response processing for the application program, to avoid a malicious behavior of a malicious program. In this embodiment of the present application, the application program operates in the normal mode. Theoretically, in a threat model, all application programs and the operating system that run in the normal mode are non-trusted, and may be malicious. In this embodiment of the present application, to ensure that the application program can successfully run, the application program is requested to initiate the secure processing request. Even if an application program is a malicious program, the application program needs to initiate the secure processing request. If a malicious program does not initiate the secure processing request to the processor, the processor does not enter the secure mode, and a user easily determines that the program is a malicious program. Therefore, a malicious behavior that may be performed by the malicious program may be avoided. If a malicious program does not initiate a secure processing request to the processor, and the secure processing request requires interaction with the user, a phishing attack, for example, a secure environment is forged to request the user to enter a password, may occur. In this case, the user may observe a security indicator to determine whether the environment is secure. For description of the security indicator, refer to description in a subsequent embodiment. If interaction with the user is not required, because the processor can perform a secure operation only when entering the secure mode, a malicious behavior of the malicious program fails in launching an attack.

It should be noted that, in some embodiments of the present application, before the processor receives the secure processing request sent by the application program in step 101, the secure interaction method provided in this embodiment of the present application may further include the following steps.

Step A1: The processor sets an accessed device to accessible by the processor operating in a secure mode.

Step A2: The processor loads an operating system to a memory operating in a normal mode such that driver code starts and executes the application program operating in the normal mode.

In this embodiment of the present application, the processor first loads the operating system to the memory operating in the secure mode when the operating system starts, and then the processor performs initialization setting in the secure mode and performs step A1 that the processor sets an accessed device to accessible by the processor operating in a secure mode. It can be learned from the foregoing description that the processor has two operating modes, a normal mode and a secure mode. Therefore, step A1 means that if the processor operates in the normal mode, the accessed device may reject access by the processor. For example, if the accessed device determines that the processor operates in the normal mode, the accessed device may not respond to an instruction of the processor. In this way, it may be ensured that, even if the accessed device operates in the normal mode, the accessed device is controlled only by the processor operating in the secure mode, and it may be avoided that the accessed device operating in the normal mode executes a malicious instruction when the accessed device encounters a malicious attack. It can be learned from the foregoing description that the memory has two operating modes, a normal mode and a secure mode. The processor loads the operating system to the secure mode when the operating system starts for the first time. After completing a security setting for the accessed device, the processor performs step A2 that the processor loads an operating system to a memory operating in a normal mode. In this case, the processor also operates in the normal mode, and the processor operating in the normal mode may interact with the memory operating in the normal mode. In this case, a current environment is in the normal mode, and the driver code may start and execute the application program in an original operating system. In this embodiment of the present application, the application program remains in the normal mode such that driver code of the application program can normally start the application program. Therefore, a problem that original driver code needs to be obtained when the application program is implemented in the secure mode again is avoided, and a problem that a TCB becomes larger because the application program is ported to the secure mode may also be avoided.

Step 102: The processor switches from a normal mode to a secure mode according to the secure processing request.

In this embodiment of the present application, after the processor operating in the normal mode receives the secure processing request sent by the application program in the normal mode, the processor needs to switch an operating mode from the normal mode to the secure mode according to the secure processing request. For the processor, a difference between operating in the normal mode and operating in the secure mode is that, when operating in the normal mode, to ensure security, the processor cannot access the memory operating in the secure mode and a peripheral operating in the secure mode. However, when operating in the secure mode, the processor can access the application program operating in the normal mode, the accessed device operating in the normal mode, and the memory operating in the secure mode. Because the memory operating in the secure mode can be accessed only by the processor operating in the secure mode, it is ensured that the memory operating in the secure mode is not accessed by the processor in the normal mode.

It can be learned from the foregoing description that, the secure mode and the normal mode are two mutually isolated running environments, and an operating mode of the processor is switched according to the secure processing request sent by the application program. If the processor does not receive the secure processing request sent by the application program, the processor still operates in the normal mode. The processor needs to perform response processing for the application program when the processor receives the secure processing request sent by the application program. When response processing is performed for the application program, to ensure security, in this embodiment of the present application, two operating modes are set for the processor, a normal mode and a secure mode. For example, in a Trusted Execution Environment (such as TRUSTZONE) technology, there are a total of three operating modes, a monitor mode, a normal mode, and a secure mode. The processor may switch from the normal mode to the secure mode using a TRUSTZONE monitoring device operating in the monitor mode. In addition, the processor may also switch from the normal mode to the secure mode according to the secure processing request and by replacing code for running the normal mode with code for running the secure mode. The operating status of the processor is switched based on dynamic trigger by the application program. That the processor switches to the secure mode is to ensure that a secure environment can be created when response processing is performed for the application program such that the user can perform man-machine interaction in the secure environment, to avoid leakage of sensitive data and an illegal attack on a device.

In some embodiments of the present application, after the processor switches from the normal mode to the secure mode according to the secure processing request in step 102, the secure interaction method provided in this embodiment of the present application may further include the following steps.

Step B1: The processor operating in the secure mode reads a security indicator from the memory operating in the secure mode.

Step B2: The processor operating in the secure mode notifies, according to the read security indicator, a user that a current environment is in a secure state.

After the operating status of the processor is switched to the secure mode, to enable the user to perceive that the processor performs response processing for the application program in the secure environment, in this embodiment of the present application, a security indicator may be further set, and the security indicator is stored in the memory operating in the secure mode. If the processor operates in the normal mode, the processor cannot obtain the security indicator. The processor can read the security indicator only when the processor operating in the secure mode interacts with the memory operating in the secure mode. After reading the security indicator from the memory operating in the secure mode, the processor operating in the secure mode performs step B2 that the processor operating in the secure mode notifies, according to the read security indicator, a user that a current environment is in a secure state. Because only the processor operating in the secure mode can obtain the security indicator, when the processor notifies the user of the current environment according to the read security indicator, the user may determine, according to the notification of the processor, that the current environment is in a secure state.

Further, in some other embodiments of the present application, that the processor operating in the secure mode notifies, according to the read security indicator, a user that a current environment is in a secure state in step B2 may include the following step.

Step B21: The processor operating in the secure mode controls, according to the read security indicator, a security indication device to operate, where the security indication device operates in the secure mode, and the security indication device responds to control of the processor only when the processor operates in the secure mode.

That is, in this embodiment of the present application, the security indication device controlled by the processor may notify the user that the current environment is in a secure state. When the security indication device operates under the control of the processor operating in the secure mode, the user may determine, according to normal operating of the security indication device, that the current environment is in a secure state. For example, the security indication device may be a light emitting diode (LED) indication device. When the processor operates in the secure mode, the processor may light up the LED indication device, to notify the user of the current environment, and the user may determine, according to the blinking LED indication device, that the current environment is in a secure state. For another example, the security indication device may be a Universal Serial Bus (USB) indication device. When the processor operates in the secure mode, the processor may control insertion or removal of the USB indication device, to notify the user of the current environment, and the user may determine, according to operating of the USB indication device, that the current environment is in a secure state.

In some other embodiments of the present application, that the processor operating in the secure mode notifies, according to the read security indicator, a user that a current environment is in a secure state in step B2 may further include the following step.

Step B22: The processor operating in the secure mode controls a display unit to display the security indicator that is read from the memory operating in the secure mode, where the display unit operates in the normal mode, and the display unit responds to control of the processor only when the processor operates in the secure mode.

That is, in this embodiment of the present application, the user is notified that the current environment is in a secure mode, not only using a security indication device controlled by the processor but also directly using a display function of an original display unit. For example, the security indicator stored in the memory operating in the secure mode is used. The security indicator can be read by the processor only when the processor operates in the secure mode, and only the user knows content of the security indicator. The processor displays the security indicator using the display unit when the processor switches to the secure mode. The user may determine that the current environment is in a secure state when the user views the security indicator using the display unit. For example, the security indicator may be a private image, a note, specified information, or the like, and is not limited herein.

Step 103: The processor operating in the secure mode reads data information into a memory operating in the secure mode.

The data information is data that the processor operating in the secure mode generates after parsing the secure processing request.

In this embodiment of the present application, after the processor switches from the normal mode to the secure mode, in order to respond to the request of the application program, the processor operating in the secure mode generates the data information after parsing the secure processing request, and then reads the data information into the memory operating in the secure mode. The data information is data obtained by the processor operating in the secure mode, and the data information is data required by the accessed device during operating. In this embodiment of the present application, the processor needs to perform different processing operations for different application programs, and the processor also needs to determine, according to a specific application program, data information that should be obtained.

It should be noted that, in this embodiment of the present application, only the processor operating in the secure mode can access the memory operating in the secure mode, and the processor operating in the normal mode is rejected when initiating access to the memory operating in the secure mode. The processor operating in the secure mode reads the data information into the memory operating in the secure mode. The processor can read the data information into the memory only when both the processor and the memory operate in the secure mode. In this case, the processor reads the data information into the memory when the current environment is in a secure state.

In some embodiments of the present application, that the processor operating in the secure mode reads data information into a memory operating in the secure mode in step 103 may further include the following step.

Step C1: The processor operating in the secure mode reads frame buffer information into the memory operating in the secure mode, where the frame buffer information is obtained, by the processor operating in the secure mode, from an interface provided by a frame buffer device, and the frame buffer device operates in the normal mode.

That is, when response processing performed by the processor for the application program is applied to a scenario of performing display to the user, the data information further refers to the frame buffer information. The processor operating in the secure mode reads the frame buffer information into the memory operating in the secure mode. The frame buffer information is obtained by the processor from the interface provided by the frame buffer device. In this embodiment of the present application, an operating mode of the frame buffer device is unchanged. The frame buffer device still operates in the normal mode, and driver code of the frame buffer device is also executed in the normal mode.

In some embodiments of the present application, that the processor operating in the secure mode reads data information into a memory operating in the secure mode in step 103 may further include the following steps.

Step C2: The processor operating in the secure mode obtains user data that is entered into an input device by the user, where the input device operates in the normal mode.

Step C3: The processor operating in the secure mode performs verification processing on the obtained user data, to obtain result data.

Step C4: The processor operating in the secure mode reads the result data into the memory operating in the secure mode.

That is, when response processing performed by the processor for the application program is applied to a scenario in which user input is required, the data information further refers to the result data that is obtained by the processor after the processor performs verification processing on the user data that is entered by the user. The processor operating in the secure mode reads the result data into the memory operating in the secure mode. The result data is obtained by the processor after the processor performs verification processing on the user data obtained from the input device. In this embodiment of the present application, an operating mode of the input device is unchanged. The input device still operates in the normal mode, and driver code of the input device is also executed in the normal mode.

Step 104: The processor operating in the secure mode controls an accessed device to operate according to the data information stored in the memory operating in the secure mode.

The accessed device operates in the normal mode, the accessed device responds to control of the processor only when the processor operates in the secure mode, and the accessed device is a device that needs to operate after being invoked by the application program.

In this embodiment of the present application, after the processor operating in the secure mode reads the data information into the memory operating in the secure mode, the processor performs response processing for the application program using the data information that is read into the memory operating in the secure mode. That is, the processor operating in the secure mode controls the accessed device to operate according to the data information. The accessed device is a device that needs to operate after being invoked by the application program that sends the secure processing request. The processor needs to perform different processing functions when there are different application programs. For example, in some application scenarios, if the application program requests the processor to perform a processing function of performing display to the user, the accessed device refers to the display unit or a display. In some application scenarios, if the application program requests the processor to perform a processing function of user input, the accessed device may refer to the input device. It may be understood that, an accessed device invoked by the processor varies as the processor operating in the secure mode performs different processing functions. In this embodiment of the present application, the accessed device operates in the normal mode, and driver code of the accessed device is also executed in the normal mode. In this embodiment of the present application, there is neither a need to implement the accessed device in the secure mode again, nor a need to port the accessed device to the secure mode. Instead, interaction security is implemented when the accessed device operates in the normal mode. The following uses examples for description.

In some embodiments of the present application, when the accessed device is the display unit, in an implementation scenario of step C1, that the processor operating in the secure mode controls an accessed device to operate according to the data information stored in the memory operating in the secure mode in step 104 may further include the following step.

Step D1: The processor operating in the secure mode controls the display unit to display the frame buffer information that is read from the memory operating in the secure mode, where the display unit operates in the normal mode, and the display unit responds to control of the processor only when the processor operates in the secure mode.

That is, when response processing performed by the processor for the application program is applied to the scenario of performing display to the user, the data information further refers to the frame buffer information. The processor determines, according to the application program, that the accessed device that needs to be invoked is the display unit, and the processor operating in the secure mode controls the display unit to display the frame buffer information that is read from the memory operating in the secure mode. Because the display unit operates in the normal mode, driver code of the display unit is also executed in the normal mode. In this embodiment of the present application, there is neither a need to implement the display unit in the secure mode again, nor a need to port the display unit to the secure mode. Instead, it is set that the display unit responds to the control of the processor only when the processor operates in the secure mode. If the processor operates in the normal mode, the display unit rejects the control of the processor.

Further, in some embodiments of the present application, that the processor operating in the secure mode controls the display unit to display the frame buffer information read from the memory operating in the secure mode in step D1 may further include the following step.

Step D11: The processor operating in the secure mode controls the display unit to display a foreground layer and a background layer, where the frame buffer information is displayed at the foreground layer, a background is displayed at the background layer, and the foreground layer and the background layer are displayed in different colors.

That is, when the processor controls the display unit to display the frame buffer information, the processor operating in the secure mode may further control the display unit to display two layers the foreground layer and the background layer. The frame buffer information is displayed at the foreground layer, and the background is displayed at the background layer, and colors of the foreground layer and the background layer are different. If a malicious attacker forges display data to overwrite the frame buffer information that is read from the memory operating in the secure mode, because the malicious attacker cannot obtain information that the processor controls the display unit to display the foreground layer and the background layer, in a manner in which the malicious attacker overwrites the frame buffer information at the foreground layer, colors of the foreground layer and the background layer after the overwriting are different from original colors before the overwriting. The user may determine, according to the foreground layer and the background layer, that the frame buffer information is overwritten.

In some embodiments of the present application, when the accessed device is the display unit, in an implementation scenario of steps C2 to C4, that the processor operating in the secure mode controls an accessed device to operate according to the data information stored in the memory operating in the secure mode in step 104 may further include the following step.

Step D2: The processor operating in the secure mode controls the display unit to display the result data that is read from the memory operating in the secure mode, where the display unit operates in the normal mode, and the display unit responds to control of the processor only when the processor operates in the secure mode.

That is, when response processing performed by the processor for the application program is applied to the scenario in which user input is required, the data information further refers to the result data that is obtained by the processor after performing verification processing. The processor determines, according to the application program, that the accessed device that needs to be invoked is the display unit, and the processor operating in the secure mode controls the display unit to display the result data that is read from the memory operating in the secure mode. Because the display unit operates in the normal mode, driver code of the display unit is also executed in the normal mode. In this embodiment of the present application, there is neither a need to implement the display unit in the secure mode again, nor a need to port the display unit to the secure mode. Instead, it is set that the display unit responds to the control of the processor only when the processor operates in the secure mode. If the processor operates in the normal mode, the display unit rejects the control of the processor.

It can be learned from the foregoing description of this embodiment of the present application that, an application program operating in a normal mode sends a secure processing request to a processor. The processor operates in the normal mode when receiving the secure processing request. Next, the processor switches from the normal mode to a secure mode according to the secure processing request. The processor operating in the secure mode reads data information into a memory operating in the secure mode, and finally, the processor operating in the secure mode controls an accessed device to operate according to the data information stored in the memory operating in the secure mode, where the accessed device operates in the normal mode, and the accessed device responds to control of the processor only when the processor operates in the secure mode. In this embodiment of the present application, an original operating mode of an application program and that of an accessed device are unchanged, and the application program and the accessed device still operate in a normal mode. However, a processor switches from the normal mode to a secure mode according to a secure processing request sent by the application program. The processor operating in the secure mode generates data information after parsing the secure processing request, and reads the data information into a memory operating in the secure mode. Therefore, the processor operating in the secure mode can access the memory operating in the secure mode. Because the accessed device responds to control of the processor only when the processor operates in the secure mode, only when operating in the secure mode, the processor can control the accessed device to operate. Therefore, security in an interaction process can be ensured in this embodiment of the present application. Because both the application program and the accessed device operate in the normal mode, driver code for driving the application program and driver code for driving the accessed device still operate in the normal mode, and there is no need to implement the driver code in the secure mode again. Therefore, there is neither a need to rely on original driver code provided by a third party, nor a need to port both the application program and the accessed device to the secure mode. Therefore, in this embodiment of the present application, all accessed devices can be supported, and a TCB can be reduced.

To better understand and implement the foregoing solutions in embodiments of the present application, the following uses a corresponding application scenario as an example for detailed description.

Figure 2:
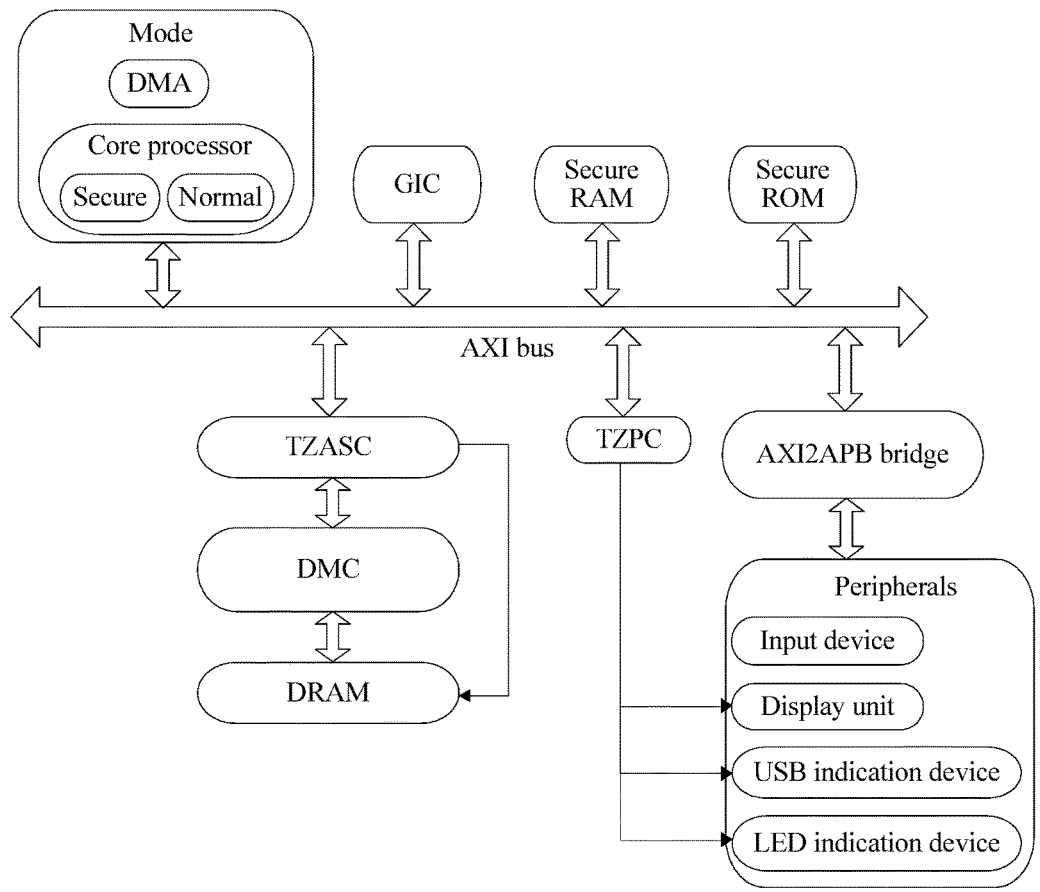
FIG. 2 is a block diagram of a hardware architecture of a secure interaction device according to an embodiment of the present application.

The following uses a scenario in which a secure interaction method provided in the embodiments of the present application is applied to a TRUSTZONE technology scenario as an example for description. Referring to FIG. 2, FIG. 2 is a block diagram of a hardware architecture of a secure interaction device according to an embodiment of the present application. A technology of the hardware architectural diagram meets TRUSTZONE technical specifications. As shown in FIG. 2, isolation between a secure mode and a normal mode is provided. In the secure mode, a malicious program in the normal mode cannot access a component protected in the secure mode, for example, a secure memory, or a display unit. FIG. 2 shows a system on chip (SoC) and peripherals connected to the SoC in the TRUSTZONE technology. The SoC includes a core processor, direct memory access (DMA), a secure random access memory (RAM), a secure read-only memory (Secure ROM) used for booting, an interrupt controller, such as a Generic Interrupt Controller (GIC) that can operate in the normal mode and the secure mode and that is integrated with support of the TRUSTZONE, a TRUSTZONE address space controller (TZASC), a TRUSTZONE protection controller (TZPC), a memory controller such as Dynamic Memory Controller (DMC), a dynamic random access memory (DRAM), and the like.

The core processor shown in FIG. 2 is the processor described in the foregoing embodiment of the present application. In the following, the core processor is still referred to as a processor. Components in the SoC are connected to each other using an Advanced eXtensible Interface bus (AXI bus). The SoC communicates with the peripherals using a High-Speed eXtensible Interface to High-Speed Peripheral Bus Bridge (for example an AXI to Advanced Peripheral Bus Bridge (AXI2APB) bridge). The AXI2APB bridge may perceive a security attribute of a transaction that currently accesses the peripherals. The AXI2APB bridge rejects the access when a transaction in the normal mode accesses a peripheral whose attribute is set to secure. The secure RAM is isolated from the secure ROM using a software and hardware mechanism, and are used to store a secure operating system. The core processor operates in two modes a secure mode and a normal mode. The TZPC sets a security attribute of a peripheral. In particular, the TZPC may set an attribute of a display unit and that of a security indicator device to secure such that software in the normal mode cannot access these devices. The TZASC is responsible for controlling security attribute division of the DRAM. The TZASC may set a part of the DRAM to secure and set the remaining part of the DRAM to non-secure. If the processor in a non-secure mode initiates an access request to the secure memory, the request is rejected. Access to the secure memory by the DMA in the normal mode is rejected. In this way, it is ensured that the secure memory is not accessed by software or hardware in the normal mode. The interrupt controller is responsible for controlling all interrupt information. The interrupt controller may set some interrupts to secure, and set some interrupts to normal, and in particular, may set an interrupt of an LED indication device to secure. In this way, only software in a secure mode can receive and process interrupt information of the LED indication device. Therefore, malware in the normal mode cannot obtain information related to the LED indication device.

For the hardware structure shown in FIG. 2, a secure interaction method may include the following steps.

Step S01: A processor starts a system in a secure manner and performs environment setting.

A processor first starts the operating system, and then enters a secure mode. In the secure mode, the processor performs initialization setting on code and environments in a monitor mode and the secure mode, and sets, using a TZPC, an LED indication device to accessible only by the processor operating in the secure mode. In this case, all memories are in the secure mode. Next, a system image running in a normal mode is loaded to the memories, to allocate specified space of a memory to the image system and set this part of the memory to the normal mode, and then transfer this part of the memory to the system image running in the normal mode.

Step S02: For a process of performing a secure operation in a normal mode to proactively switch to a secure mode, refer to FIG. 3A.

Figure 3A:
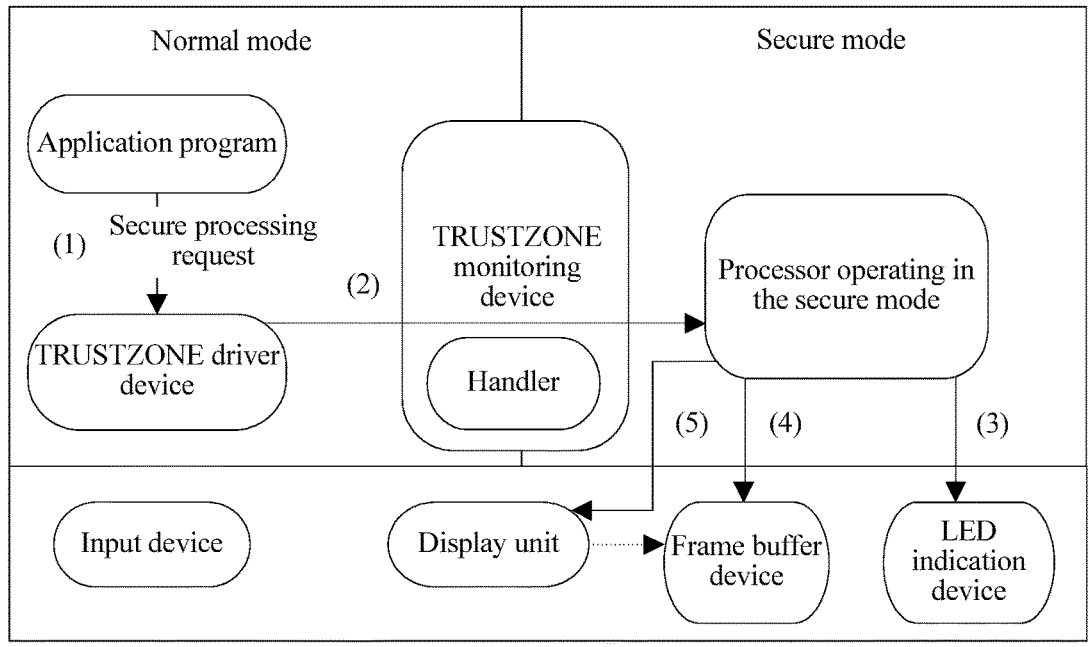
FIG. 3A is a schematic diagram of an application scenario of a secure interaction method according to an embodiment of the present application.

FIG. 3A is a schematic diagram of an application scenario of a secure interaction method according to an embodiment of the present application. Implementation content of (1), (2), (3), (4), and (5) is as follows. (1) An application program operating in the normal mode sends a secure processing request to a TRUSTZONE driver device. (2) The TRUSTZONE driver obtains the request parameter and current frame buffer information, and then the processor switches to the secure mode. For (3), (4), and (5), in an example in which an accessed device is the LED indication device, the processor operating in the secure mode lights up the LED indication device to enable a user to perceive that a current environment is in a secure state, and then sets, as a secure memory, a memory corresponding to the frame buffer information that is transferred to the processor, and sets a Display Unit to operable only by the processor operating in the secure mode. In this case, the user may perform a secure interaction operation.

Step S03: The processor operating in the secure mode draws two layers, a foreground layer and a background layer, when interface display is required in the secure mode. The foreground layer is used to display frame buffer information such as a text or a key, and the background layer is covered by a secure display background. The two layers are displayed in different color tones, to help the user to distinguish the two layers. It is assumed that a background color is displayed as X and a foreground color is displayed as Y. In this case, the LED indication device cyclically blinks in the X and Y colors. When viewing that the LED indication device blinks in colors the same as the foreground color and the background color, the user may determine that the display is secure and correct. For example, an attacker may cover a display layer to cheat the user. If the display layer is covered, the attacker needs to know the colors of the foreground layer and the background layer. If colors after the covering are different from the foreground color and the background color before the covering, the user is easily aware that the display layer is covered.

Step S04: When the user needs to perform an input operation in the secure mode, refer to FIG. 3B.

Figure 3B:
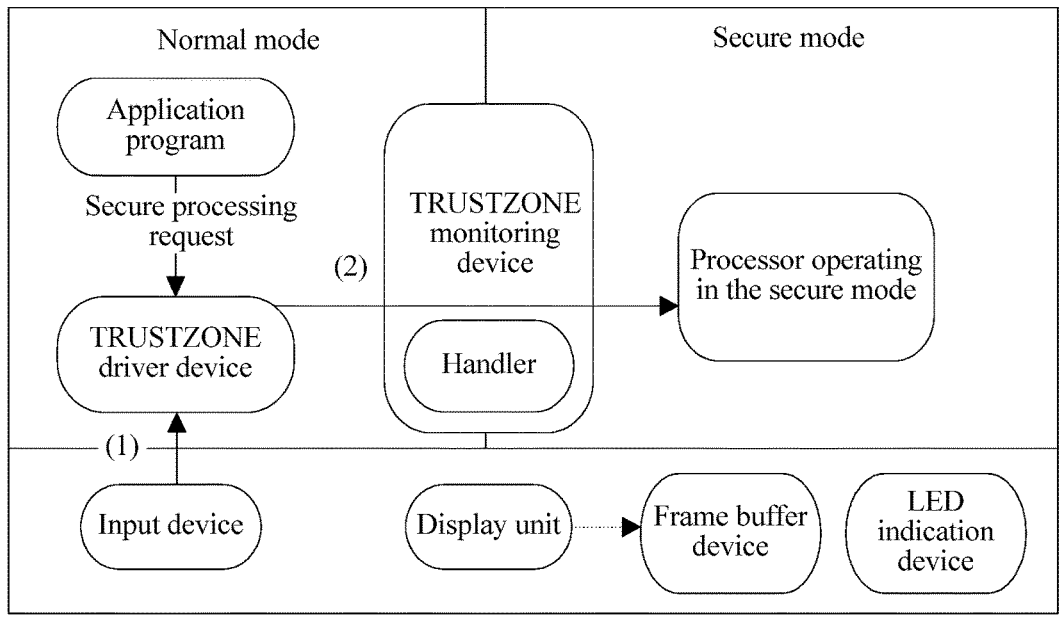
FIG. 3B is a schematic diagram of another application scenario of a secure interaction method according to an embodiment of the present application.

FIG. 3B is a schematic diagram of another application scenario of a secure interaction method according to an embodiment of the present application. Implementation content of (1) and (2) is as follows. (1) Information entered by the user is obtained by an input module such as a touch input module, is processed by an input driver in the normal mode, and then is read by the TRUSTZONE driver in the normal mode. (2) The TRUSTZONE driver transfers the read user data to the processor operating in the secure mode, and the processor operating in the secure mode performs corresponding logic processing.

The foregoing described application scenarios mainly relate to two aspects, secure state identification and verification, and data security ensuring when a non-trusted driver is used.

Secure state identification and verification are collaboratively completed by the LED indication device and the processor operating in the secure mode. According to one aspect, if the LED indication device is lit up, it indicates that the current environment is in a secure state, or if the LED indication device is not lit up, it indicates that the current environment is in a normal state. Because the LED indication device cannot be accessed or operated in the normal mode, security and correctness of the LED indication device are ensured. According to a second aspect, when an interface is displayed in the secure mode, the display layer includes the foreground layer and the background layer. The two layers are displayed in random colors that are the same as colors cyclically displayed by the LED indication device.

In the secure interaction method provided in this embodiment of the present application, two types of malicious attack behaviors may be successfully defended against, and are separately described using examples in the following. First, if a display controller corresponds to multiple pieces of frame buffer information, a frame buffer stored in a memory operating in the secure mode may be only one of the multiple frame buffers. Because display driver code runs in the normal mode, and a secure frame buffer is likely overwritten, an attacker may forge display data to cheat the user, for example, the attacker overwrites sensitive data by means of careful construction. Second, a frame buffer that is transferred by a malicious application program operating in the normal mode to the processor operating in the secure mode may be an invalid parameter. For the first type of attack, because the application program in the normal mode cannot know current display data in the secure mode and a current state of the LED indication device, once the display data in the secure mode is overwritten, screen display colors (the foreground color and the background color) viewed by the user may be different from colors in which the LED indication device blinks. In this case, the user may determine that the secure Frame Buffer is overwritten. To further increase difficulty of successfully launching an attack, the foreground color and the background color may be randomly changed at intervals of a time period. For the second type of attack, only a service rejection effect is generated, and the user data is not leaked out. The LED indication device is used as a security indicator, and may be a peripheral having one indicator, and the indicator may cyclically blink to display the foreground color and the background color, or may be a peripheral having at least two indicators such that one indicator can display a current background color and another indicator displays a current foreground color.

Figure 3C:
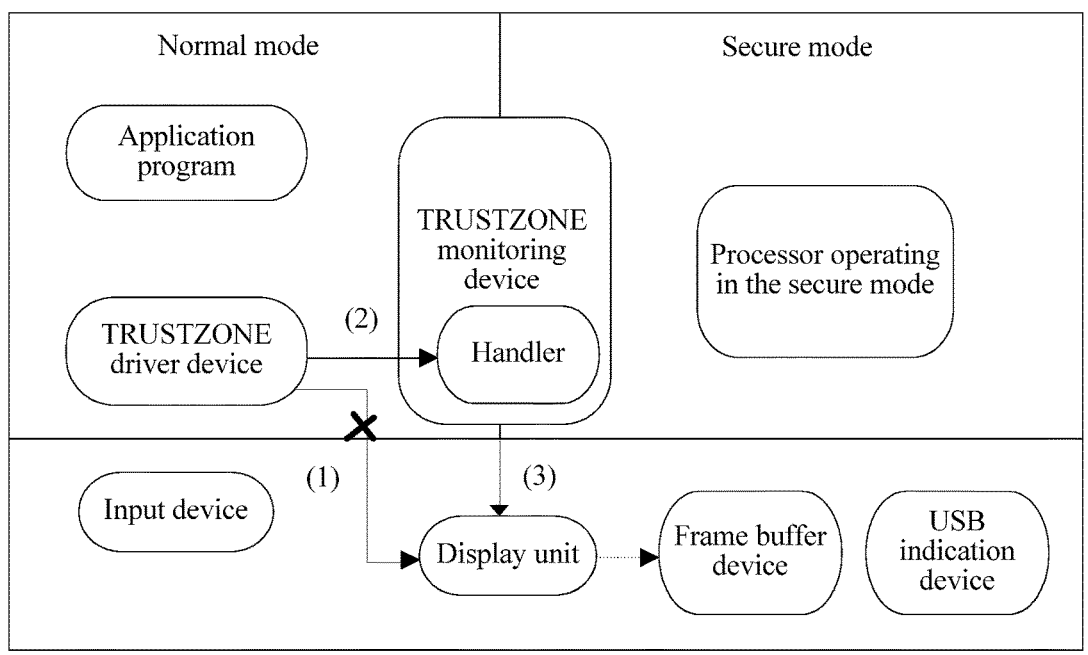
FIG. 3C is a schematic diagram of an application scenario of a monitor mode according to an embodiment of the present application.

Data security is ensured when the non-trusted driver is used. For a touch event, a user tapping position may be obtained in the normal mode. However, current display content cannot be known in the normal mode, and a displayed keyboard is usually permuted. In this way, even if the tapping position is known, useful information cannot be obtained, and data is still secure. In this embodiment of the present application, when displaying data, the display unit accesses a frame buffer using DMA. In a TRUSTZONE-based environment, the secure memory cannot be accessed by the DMA in the normal mode either. Therefore, in this case, the display unit further needs to be set to accessible only by the processor operating in the secure mode. If the DMA is initiated by a peripheral operating in the normal mode, only a memory operating in the normal mode can be accessed. On the contrary, if the DMA is initiated by a peripheral operating in the secure mode, all memories can be accessed. The display unit needs to implement display by performing a DMA operation to copy a frame buffer memory information to a display memory. The memory into which the frame buffer is read operates in the secure mode. The display unit can read correct data and display the data after accessing, using the DMA, the memory operating in the secure mode. However, because the display driver code runs in the normal mode, during running, the code may need to change some states of the display unit. For such access, an exception occurs in the processor due to security permission, and the processor is trapped in the monitor mode. As shown in FIG. 3C, FIG. 3C is a schematic diagram of an application scenario of the monitor mode according to an embodiment of the present application, where (2) and (3) need to be performed instead of (1). A handler module is invoked in the monitor mode, to complete a corresponding operation on the display unit, and then the processor returns to the normal mode to continue to execute the display driver code.

Figure 4:
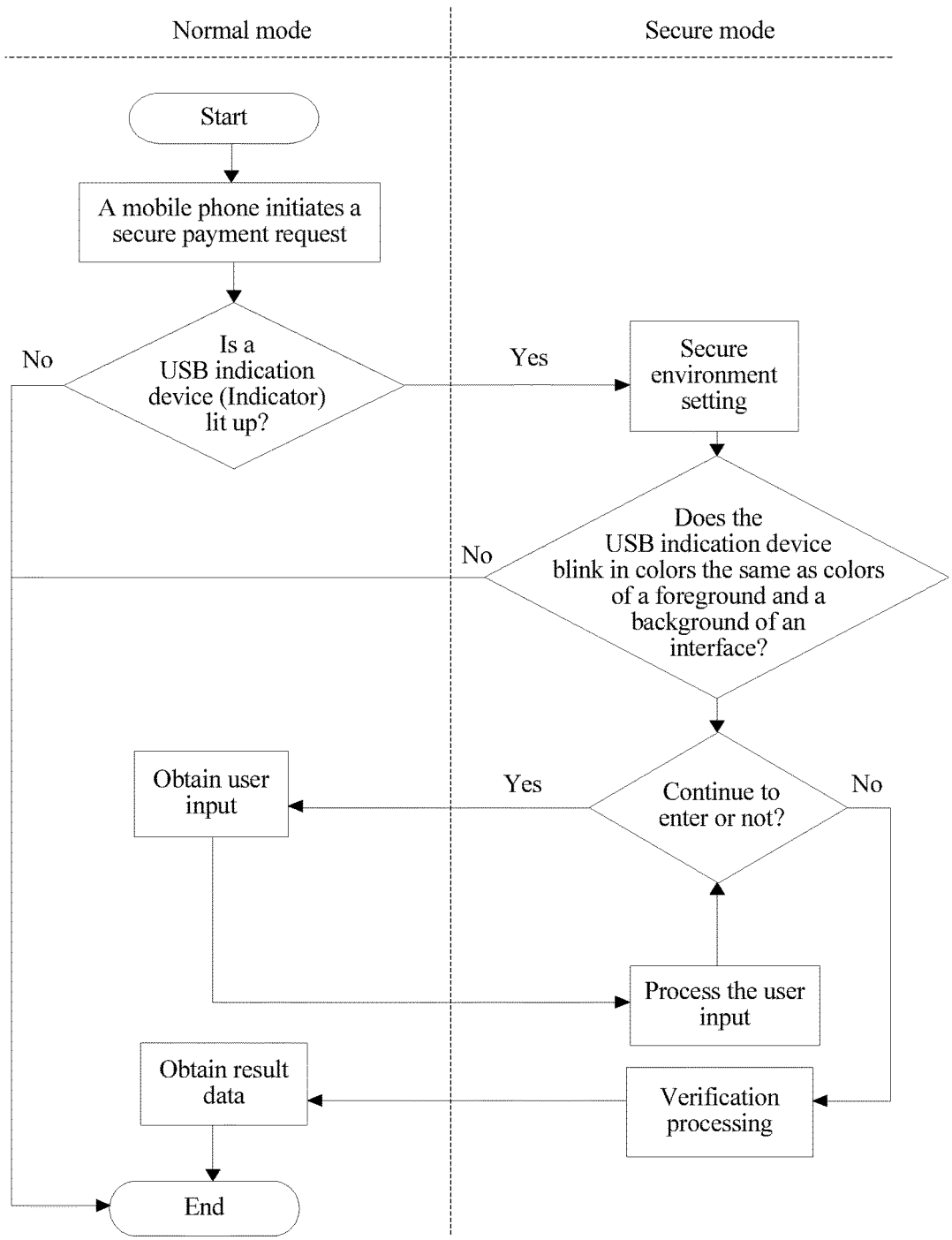
FIG. 4 is a schematic diagram of another application scenario of a secure interaction method according to an embodiment of the present application.

The following uses an example in which a personal identification number (PIN) is entered into a mobile phone for payment. Referring to FIG. 4, FIG. 4 is a schematic diagram of another application scenario of a secure interaction method according to an embodiment of the present application.

1. A user performs a purchase behavior using a common application program in a normal mode and prepares for payment. In this case, payment information is generated and needs to be confirmed by the user by entering a PIN. In this case, the application program operating in the normal mode initiates a secure processing request, and a processor switches from the normal mode to a secure mode.

2. After entering the secure mode, the processor performs some security settings. In this case, an LED indication device is lit up, to notify the user that a current environment is in a secure state. When finding that the LED indication device is not lit up, the user may determine that the current environment is not in the secure mode and the user may cancel an operation.

3. Display information that appears in the secure mode is that the payment information is displayed and an interface in which the PIN needs to be entered pops up. The processor draws two layers, a foreground layer and a background layer. The two layers are displayed in colors A and B. In this case, the LED indication device (it is assumed that the LED indication device has only one indicator) cyclically displays the two colors A and B. The user may determine that the current display information is trusted when viewing that the foreground layer and the background layer are in same colors as colors displayed by the LED indication device. If the user finds that a color of partial content displayed on a screen is different from the colors of the two layers, the user may determine that the display information is tampered and the user may cancel a further operation.

4. After the user determines that the current information is in a trusted state, the user may start an operation of entering the PIN. The PIN input information is obtained by an input module operating in the normal mode and is sent by a TRUSTZONE driver to the processor operating in the secure mode. The processor operating in the secure mode may process the data and display processed data.

5. After the user completes entering, the processor operating in the secure mode performs verification processing on user data entered by the user, turns off the LED indication device, and switches to the normal mode to return result data to the application program in the normal mode, and the secure operation transaction ends.

It can be learned from the foregoing example that, in the secure interaction method provided in this embodiment of the present application, a user operation is performed by means of isolation, to ensure data security in an isolated environment using a TCB as small as possible. In the foregoing process, existing code of a driver device in a normal mode is reused and data security is ensured. Further, a security indicator and display of a display unit may be combined to determine a current secure state of a current environment.

It should be noted that, to make the description brief, the foregoing method embodiments are expressed as a series of actions. However, persons skilled in the art should appreciate that the present application is not limited to the described action sequence, because according to the present application, some steps may be performed in other sequences or performed simultaneously. In addition, persons skilled in the art should also appreciate that all the embodiments described in the specification are examples of the embodiments, and the related actions and modules are not necessarily mandatory to the present application.

To better implement the foregoing solutions of embodiments of the present application, the following further provides a related apparatus used to implement the foregoing solutions.

Figure 5A:
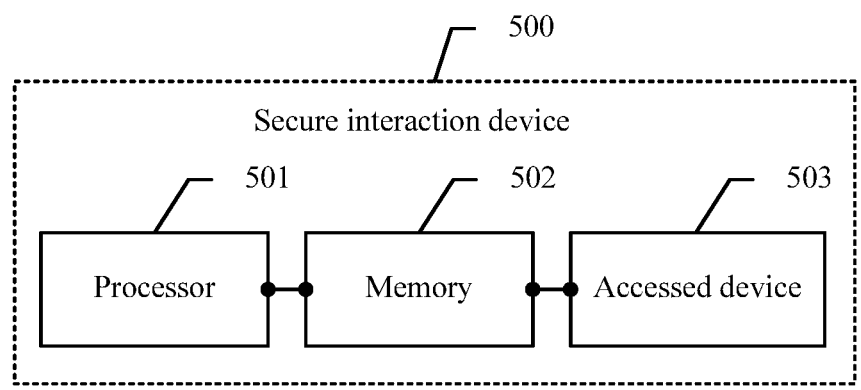
FIG. 5A is a schematic structural composition diagram of a secure interaction device according to an embodiment of the present application.

As shown in FIG. 5A, a secure interaction device 500 provided in this embodiment of the present application may include a processor 501, a memory 502, and an accessed device 503.

The processor 501 is configured to receive a secure processing request sent by an application program, where the application program operates in a normal mode, and the processor 501 operates in the normal mode when receiving the secure processing request.

The processor 501 is configured to switch from the normal mode to a secure mode according to the secure processing request.

The processor 501 operating in the secure mode is configured to read data information into the memory 502 operating in the secure mode, where the data information is data that the processor 501 operating in the secure mode generates after parsing the secure processing request.

The processor 501 operating in the secure mode is configured to control the accessed device 503 to operate according to the data information stored in the memory 502 operating in the secure mode, where the accessed device 503 operates in the normal mode, the accessed device 503 responds to control of the processor 501 only when the processor 501 operates in the secure mode, and the accessed device 503 is a device that needs to operate after being invoked by the application program.

In some embodiments of the present application, the processor 501 operating in the secure mode is further configured to read a security indicator from the memory 502 operating in the secure mode after the processor 501 switches from the normal mode to the secure mode according to the secure processing request.

The processor 501 operating in the secure mode is further configured to notify, according to the read security indicator, a user that a current environment is in a secure state.

Figure 5B:
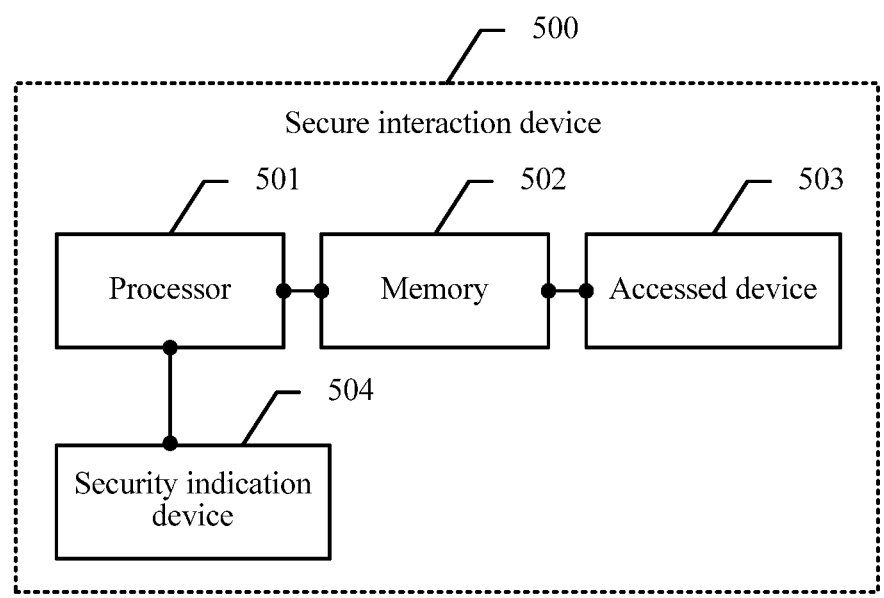
FIG. 5B is a schematic structural composition diagram of another secure interaction device according to an embodiment of the present application.

In some embodiments of the present application, as shown in FIG. 5B, the secure interaction device 500 further includes a security indication device 504.

The processor 501 operating in the secure mode is further configured to control, according to the read security indicator, the security indication device 504 to operate, where the security indication device 504 operates in the secure mode, and the security indication device 504 responds to control of the processor 501 only when the processor 501 operates in the secure mode.

In some embodiments of the present application, the processor 501 operating in the secure mode is further configured to control a display unit to display the security indicator that is read from the memory 502 operating in the secure mode, where the display unit operates in the normal mode, and the display unit responds to control of the processor 501 only when the processor operates in the secure mode.

In some embodiments of the present application, the processor 501 operating in the secure mode is further configured to read frame buffer information into the memory 502 operating in the secure mode, where the frame buffer information is obtained, by the processor 501 operating in the secure mode, from an interface provided by a frame buffer device, and the frame buffer device operates in the normal mode.

In some embodiments of the present application, the accessed device 503 is the display unit, and the processor 501 operating in the secure mode is further configured to control the display unit to display the frame buffer information that is read from the memory 502 operating in the secure mode, where the display unit operates in the normal mode, and the display unit responds to control of the processor 501 only when the processor 501 operates in the secure mode.

In some embodiments of the present application, the processor 501 operating in the secure mode is further configured to control the display unit to display a foreground layer and a background layer, where the frame buffer information is displayed at the foreground layer, a background is displayed at the background layer, and the foreground layer and the background layer are displayed in different colors.

In some embodiments of the present application, the processor 501 operating in the secure mode is further configured to obtain user data that is entered into an input device by the user, where the input device operates in the normal mode, perform verification processing on the obtained user data, to obtain result data, and read the result data into the memory operating in the secure mode.

In some embodiments of the present application, the accessed device 503 is the display unit, and the processor 501 operating in the secure mode is further configured to control the display unit to display the result data that is read from the memory 502 operating in the secure mode, where the display unit operates in the normal mode, and the display unit responds to control of the processor 501 only when the processor 501 operates in the secure mode.

In some embodiments of the present application, the processor 501 is further configured to set the accessed device 503 to accessible by the processor 501 operating in the secure mode.

The processor 501 is further configured to load an operating system to the memory 502 operating in the normal mode such that driver code starts and executes the application program operating in the normal mode.

It can be learned from the foregoing description of this embodiment of the present application that, an application program operating in a normal mode sends a secure processing request to a processor 501. The processor 501 operates in the normal mode when receiving the secure processing request. Next, the processor 501 switches from the normal mode to a secure mode according to the secure processing request. The processor 501 operating in the secure mode reads data information into a memory 502 operating in the secure mode, and finally, the processor 501 operating in the secure mode controls an accessed device 503 to operate according to the data information stored in the memory 502 operating in the secure mode, where the accessed device 503 operates in the normal mode, and the accessed device 503 responds to control of the processor 501 only when the processor 501 operates in the secure mode. In this embodiment of the present application, an original operating mode of an application program and that of an accessed device 503 are unchanged, and the application program and the accessed device 503 still operate in a normal mode. However, a processor 501 switches from the normal mode to a secure mode according to a secure processing request sent by the application program. The processor 501 operating in the secure mode generates data information after parsing the secure processing request, and reads the data information into a memory 502 operating in the secure mode. Therefore, the processor 501 operating in the secure mode can access the memory 502 operating in the secure mode. Because the accessed device 503 responds to control of the processor 501 only when the processor 501 operates in the secure mode, only when operating in the secure mode, the processor 501 can control the accessed device 503 to operate. Therefore, security in an interaction process can be ensured in this embodiment of the present application. Because both the application program and the accessed device 503 operate in the normal mode, driver code for driving the application program and driver code for driving the accessed device 503 still operate in the normal mode, and there is no need to implement the driver code in the secure mode again. Therefore, there is neither a need to rely on original driver code provided by a third party, nor a need to port both the application program and the accessed device 503 to the secure mode. Therefore, in this embodiment of the present application, all accessed devices 503 can be supported, and a TCB can be reduced.

In addition, it should be noted that the described apparatus embodiment is only an example. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments. In addition, in the accompanying drawings of the apparatus embodiments provided by the present application, connection relationships between modules indicate that the modules have communication connections with each other, and the communication connections may be further implemented as one or more communications buses or signal cables. Persons of ordinary skill in the art may understand and implement the embodiments of the present application without creative efforts.

Based on the description of the foregoing implementation manners, persons skilled in the art may clearly understand that the present application may be implemented by software in addition to necessary universal hardware, or by dedicated hardware, including a dedicated integrated circuit, a dedicated central processing unit (CPU), a dedicated memory, a dedicated component, and the like. Generally, any functions that can be performed by a computer program can be easily implemented using corresponding hardware. Moreover, a specific hardware structure used to achieve a same function may be of various forms, for example, in a form of an analog circuit, a digital circuit, a dedicated circuit, or the like. However, as for the present application, software program implementation is a better implementation manner in most cases. Based on such an understanding, the technical solutions of the present application essentially or the part contributing to the prior art may be implemented in a form of a software product. The software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a server, a network device, and the like) to perform the methods described in the embodiments of the present application.

The foregoing embodiments are only intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present application.

What is claimed is:

1. A secure interaction method, implemented by a secure interaction device comprising memory operating in a normal mode and memory operating in a secure mode, wherein the secure interaction method comprises:

receiving, by a processor, a secure processing request from an application program, wherein the application program is comprised in the memory operating in the normal mode and operates in the normal mode, and wherein the processor operates in the normal mode when receiving the secure processing request;

switching, by the processor, from the normal mode to the secure mode when receiving the secure processing request;

reading, by the processor operating in the secure mode, data information into the memory operating in the secure mode, wherein the data information is data that the processor operating in the secure mode generates after parsing the secure processing request; and controlling, by the processor operating in the secure mode, an accessed device to operate according to the data information stored in the memory operating in the secure mode, wherein the accessed device operates in the normal mode, wherein the accessed device responds to control of the processor when the processor operates in the secure mode, wherein the accessed device operates after being invoked by the application program, wherein driver code for driving the application program and driver code for driving the accessed device operate in the normal mode, wherein the secure mode and the normal mode are two mutually isolated running environments, wherein the processor, when operating in the normal mode, cannot access the memory operating in the secure mode, and wherein the processor, when operating in the secure mode, can access the application program operating in the normal mode.

2. The secure interaction method of claim 1, wherein after switching from the normal mode to the secure mode, the secure interaction method further comprises:
    reading, by the processor operating in the secure mode, a security indicator from the memory operating in the secure mode; and
    notifying, according to the security indicator by the processor operating in the secure mode, a user that a current environment is in a secure state.

3. The secure interaction method of claim 2, wherein notifying the user that the current environment is in the secure state comprises controlling, according to the security indicator by the processor operating in the secure mode, a security indication device to operate, wherein the security indication device operates in the secure mode, and wherein the security indication device responds to control of the processor only when the processor operates in the secure mode.

4. The secure interaction method of claim 2, wherein notifying the user that the current environment is in the secure state comprises controlling, by the processor operating in the secure mode, a display to display the security indicator read from the memory operating in the secure mode, wherein the display operates in the normal mode, and wherein the display responds to control of the processor only when the processor operates in the secure mode.

5. The secure interaction method of claim 1, wherein reading the data information into the memory operating in the secure mode comprises reading, by the processor operating in the secure mode, frame buffer information into the memory operating in the secure mode, wherein the frame buffer information is obtained, by the processor operating in the secure mode, from an interface provided by a frame buffer device, and wherein the frame buffer device operates in the normal mode.

6. The secure interaction method of claim 5, wherein the accessed device is a display, and wherein controlling the accessed device to operate according to the data information stored in the memory operating in the secure mode comprises controlling, by the processor operating in the secure mode, the display to display the frame buffer information read from the memory operating in the secure mode, wherein the display operates in the normal mode, and wherein the display responds to control of the processor only when the processor operates in the secure mode.

7. The secure interaction method of claim 6, wherein controlling the display to display the frame buffer information read from the memory operating in the secure mode comprises controlling, by the processor operating in the secure mode, the display to display a foreground layer and a background layer, wherein the frame buffer information is displayed at the foreground layer, wherein a background is displayed at the background layer, and wherein the foreground layer and the background layer are displayed in different colors.

8. The secure interaction method of claim 1, wherein reading the data information into the memory operating in the secure mode comprises:
    obtaining, by the processor operating in the secure mode, user data entered into an input device by a user, wherein the input device operates in the normal mode;
    performing, by the processor operating in the secure mode, verification processing on the user data to obtain result data; and
    reading, by the processor operating in the secure mode, the result data into the memory operating in the secure mode.

9. The secure interaction method of claim 8, wherein the accessed device is a display, and wherein controlling the accessed device to operate according to the data information stored in the memory operating in the secure mode comprises controlling, by the processor operating in the secure mode, the display to display the result data read from the memory operating in the secure mode, wherein the display operates in the normal mode, and wherein the display responds to control of the processor only when the processor operates in the secure mode.

10. The secure interaction method of claim 1, wherein before receiving the secure processing request from the application program, the secure interaction method further comprises:
    setting, by the processor, the accessed device to accessible by the processor operating in the secure mode; and
    loading, by the processor, an operating system to the memory operating in the normal mode such that driver code starts and executes the application program operating in the normal mode.

11. A secure interaction device, comprising:
    a processor;
    a memory coupled to the processor, wherein the memory comprises memory operating in a normal mode and memory operating in a secure mode; and
    an accessed device coupled to the processor,
    wherein the processor is configured to:
        receive a secure processing request from an application program, wherein the application program is comprised in the memory operating in the normal mode and operates in the normal mode, and wherein the processor operates in the normal mode when receiving the secure processing request;
        switch from the normal mode to the secure mode when receiving the secure processing request;
        read data information into the memory operating in the secure mode, wherein the data information is data that the processor operating in the secure mode generates after parsing the secure processing request, and wherein the processor operates in the secure mode; and
        control the accessed device to operate according to the data information stored in the memory operating in the secure mode, wherein the accessed device operates in the normal mode, wherein the processor operates in the secure mode, wherein the accessed device responds to control of the processor when the processor operates in the secure mode, wherein the accessed device operates after being invoked by the application program, wherein driver code for driving the application program and driver code for driving the accessed device operate in the normal mode, wherein the secure mode and the normal mode are two mutually isolated running environments, wherein the processor, when operating in the normal mode, cannot access the memory operating in the secure mode, and wherein the processor, when operating in the secure mode, can access the application program operating in the normal mode.

12. The secure interaction device of claim 11, wherein when operating in the secure mode, the processor is further configured to:
read a security indicator from the memory operating in the secure mode; and
notify, according to the security indicator, a user that a current environment is in a secure state.

13. The secure interaction device of claim 12, further comprising a security indication device coupled to the processor, wherein when operating in the secure mode, the processor is further configured to control, according to the security indicator, the security indication device to operate, wherein the security indication device operates in the secure mode, and wherein the security indication device responds to control of the processor only when the processor operates in the secure mode.

14. The secure interaction device of claim 12, wherein when operating in the secure mode, the processor is further configured to control a display to display the security indicator read from the memory operating in the secure mode, wherein the display operates in the normal mode, and wherein the display responds to control of the processor only when the processor operates in the secure mode.

15. The secure interaction device of claim 11, wherein when operating in the secure mode, the processor is further configured to read frame buffer information into the memory operating in the secure mode, wherein the frame buffer information is obtained, by the processor operating in the secure mode, from an interface provided by a frame buffer device, and wherein the frame buffer device operates in the normal mode.

16. The secure interaction device of claim 15, wherein the accessed device is a display, wherein the processor is further configured to control, when operating in the secure mode, the display to display the frame buffer information read from the memory operating in the secure mode, wherein the display operates in the normal mode, and wherein the display responds to control of the processor only when the processor operates in the secure mode.

17. The secure interaction device of claim 16, wherein when operating in the secure mode, the processor is further configured to control the display to display a foreground layer and a background layer, wherein the frame buffer information is displayed at the foreground layer, wherein a background is displayed at the background layer, and wherein the foreground layer and the background layer are displayed in different colors.

18. The secure interaction device of claim 11, wherein when operating in the secure mode, the processor is further configured to:
obtain user data entered into an input device by a user, wherein the input device operates in the normal mode;
perform verification processing on the user data to obtain result data; and
read the result data into the memory operating in the secure mode.

19. The secure interaction device of claim 18, wherein the accessed device is a display, wherein when operating in the secure mode, the processor is further configured to control the display to display the result data read from the memory in the secure mode, wherein the display operates in the normal mode, and wherein the display responds to control of the processor only when the processor operates in the secure mode.

20. The secure interaction device of claim 11, wherein the processor is further configured to:
set the accessed device to accessible by the processor operating in the secure mode; and
load an operating system to the memory operating in the normal mode such that driver code starts and executes the application program operating in the normal mode.

* * * * *

UNITED STATES PATENT AND TRADEMARK OFFICE
CERTIFICATE OF CORRECTION

PATENT NO. : 10,499,248 B2
APPLICATION NO. : 15/435507
DATED : December 3, 2019
INVENTOR(S) : Wenhao Li, Yubin Xia and Haibo Chen Page 1 of 1

It is certified that error appears in the above-identified patent and that said Letters Patent is hereby corrected as shown below:

On the Title Page

Add missing Related U.S. Application Data "Continuation of Application No. PCT/CN2014/084893, filed on Aug. 21, 2014"

In the Claims

Claim 19, Column 26, Line 25 and 26: "the memory in the secure mode" should read "the memory operating in the secure mode"

Signed and Sealed this
Twenty-first Day of January, 2020

Andrei Iancu
*Director of the United States Patent and Trademark Office*